United States Patent [19]

Pampus et al.

[11] 3,907,757
[45] Sept. 23, 1975

[54] UNSATURATED POLYMERS CONTAINING REACTIVE GROUPS

[75] Inventors: Gottfried Pampus; Günther Lehnert, both of Leverkusen; Josef Witte, Cologne, all of Germany

[73] Assignee: Bayer Aktiengesellschaft, Germany

[22] Filed: Jan. 14, 1972

[21] Appl. No.: 217,972

[30] Foreign Application Priority Data
Jan. 15, 1971  Germany............................ 2101684

[52] U.S. Cl.... 260/79.3 R; 260/79.5 NV; 260/80.7; 260/80.78; 260/82.1; 260/83.3; 260/85.1; 260/93.1; 260/94.7 HA; 260/94.7 S; 260/94.7 A; 260/94.7 N

[51] Int. Cl.... C08f 27/02; C08f 27/06; C08f 27/08

[58] Field of Search............... 260/80.78, 85.1, 93.1, 260/94.7 HA, 94.7 S, 94.7 A, 94.7 N, 879, 79.3 R, 79.5

[56] References Cited
UNITED STATES PATENTS

| | | |
|---|---|---|
| 3,116,274 | 12/1963 | Boehm et al.................. 260/94.9 C |
| 3,129,208 | 4/1964 | Jezl et al. ....................... 260/94.9 C |
| 3,412,078 | 11/1969 | Hagemeyer et al............... 260/93.7 |
| 3,453,346 | 7/1969 | Hagemeyer et al............. 260/878 B |
| 3,458,598 | 7/1969 | Craven............................ 260/878 B |
| 3,481,914 | 12/1969 | Holler et al. .................... 260/878 B |
| 3,649,709 | 3/1972 | Medema et al. ................ 260/94.7 R |
| 3,707,520 | 12/1972 | Pampus et al. ..................... 260/93.1 |
| 3,804,803 | 4/1974 | Streck et al........................ 260/93.1 |

Primary Examiner—Edward J. Smith
Attorney, Agent, or Firm—Connolly and Hutz

[57] ABSTRACT

Process for producing polymers with reactive groups wherein a —CH=CH-containing polymer is reacted with a substituted olefin in the presence of a catalyst of
a. a compound of a metal of groups Vb or VIb of the Periodic Table and
b. an organo compound of a metal of groups Ia to IVa of the Periodic Table.

5 Claims, No Drawings

UNSATURATED POLYMERS CONTAINING REACTIVE GROUPS

The invention relates to a process for the preparation of hydrocarbon polymers which contain CH=CH bonds and reactive groups, preferably polymers which carry these reactive groups as end groups.

Processes for the preparation of polymers with certain end groups are already known. The processes previously described are all restricted to the use of a given initiator system so that the microstructure of the polymers produced is predetermined. These processes are also restricted in the number or the chemical constitution of the functional groups which can be introduced. These processes include, for example, the polymerisation of vinyl compounds initiated by a free radical reaction carried out in the presence of carbontetrachloride or carbon tetrabromide and the reaction of "living polymers" with compounds which are capable of reacting with an alkali metal-carbon bond.

It is therefore an object of this invention to introduce any number of reactive groups of various chemical constitution into polymers which contain —CH=CH- groups. In this process, the introduction of functional groups may be carried out completely independently of the initiator system used for producing the polymer which contains —CH=CH-groups and therefore independently of the microstructure of the polymer.

The process of the invention comprises reacting polymers which contain —CH=CH-groups in their main chain and/or in a side chain with substituted olefines of the formula $$R-CH=CH-R \quad (I)$$

in the presence of organometallic mixed catalysts of
a. a compound of a metal of groups Vb or VIb of the Periodic System (see Handbook of Chemistry and Physics, 47th Edition (1966), page B-3) and
b. an organometallic compound of a metal of Groups Ia to IV a of the Periodic System.

In formula (I)
R represents hydrogen, alkyl, cycloalkyl, aralkyl, aryl, alkaryl, alkoxyalkyl, aroxyalkyl, alkylene carboxyalkyl, alkylene carboxyaryl, alkylcarboxyalkylene, aroxyalkylene, alkylenearylsulphone or alkylenearyl thioether, at least one of the radicals R is not hydrogen and is substituted with an electron accepting radical X.

In particular,
R represents a straight chain or branched chain alkyl radical containing 1–6 carbon atoms, a cycloalkyl radical having 5–7 ring carbon atoms or one of the following radicals which is substituted by X, preferably on the carbon atom marked with *. X is preferably chlorine, bromine, iodine, C ≡ N, NO$_2$ or

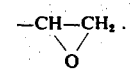

The following are examples of such compounds: Allyl chloride, allyl bromide, allyl iodide, crotyl bromide, 1,4-dichlorobutene-2, allyl glycidyl ether, dihydromuconic acid dinitrile, 4,4'-dinitrostilbene, an allyl ester of monochloroacetic acid, an allyl ester of o, m, p-nitrobenzoic acid, butene-2-diol-1,4-dichloroacetate, butene-2-diol-1,4-di-p-nitrobenzoate, butylene glycol-1,4-di-p-nitrophenylether, p-nitrocinnamic acid ester, dihydromuconic acid diglycidiyl ester, 1,8-dibromooctene-4, 1-bromo-butene-3, 1,4-bis-(p-nitrophenyl)-butene-2.

The quantity of the substituted olefin of formula I with which the —CH=CH-containing polymer is reacted is 0.005 to 0.5 mol per mol of double bonds in the main chain of the polymer, and 0.01 to 1 mol per mol of double bonds in the side chains of the polymer.

Any polymer having —CH=CH-groups is suitable in the process of this invention. These —CH=CH-groups can be present in the main chain of the polymer or in side chains or in both.

One suitable class of polymers of this type are those of conjugated dienes having 4 to 8 carbon atoms. This term is understood to include homopolymers, copolymers of different conjugated dienes and copolymers of dienes with up to 80 % by weight of monoethylenically unsaturated compounds. Examples of suitable conjugated dienes are 1,3-dienes, such as butadiene, isoprene and piperylene. Their homo- and copolymers are suitable regardless of the stearic arrangement of the monomer units and regardless of the relative amount of such dienes in the copolymer.

Examples of monoethylenically unsaturated compounds are aliphatic monovinyl compounds and monovinyl aromatic compounds, such as alkyl esters (preferably 1 to 6 carbon atoms) amides and nitriles of acrylic and methacrylic acid e.g. ethyl acrylate, methyl methacrylate, acrylonitrile and methacryl amide and respectively styrene, α-methyl styrene, vinyl toluene and vinyl pyrrolidone.

Examples of this type of polymers are: cis-1,4-polybutadiene, 1,2-polybutadiene, cis-1,4-polyisoprene, 1,2-polyisoprene, all interpolymers of butadiene, isoprene and piperylene, butadiene styrene copolymers wherein the butadiene units have 1,4, 1,2

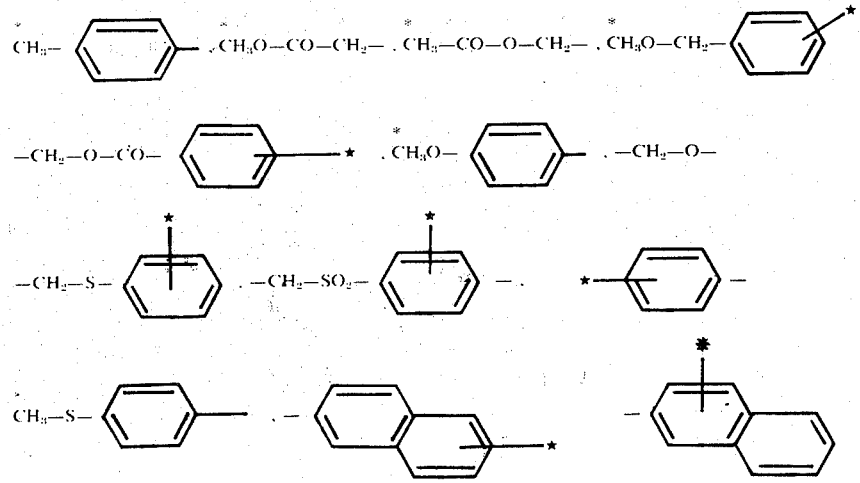

or both configurations wherein the distribution of butadiene and styrene units is statistical or block and the weight ratio of butadiene:styrene is 95:5 to 20:80.

Another suitable group of polymers are ethylene,-propylene terpolymers wherein the weight ratio of ethylene:propylene is 20:80 to 80:20 and which contain 1 to 20 % by weight, preferably 4 to 12 % by weight (based on the total polymer) of a polymerised third monomer which introduces a —CH=CH-group. Suitable third monomers are conjugated diolefins having 4 to 8 carbon atoms such as butadiene, isoprene and piperylene and non-conjugated diolefins. Examples of such non-conjugated diolefins are straight or branched chain diolefins such as those in which both double bonds are terminal, as in 1,4-pentadiene, 1,5-hexadiene, 2-methyl-1,5-hexadiene, 3,3-dimethyl-1,5-hexadiene, 1,7-octadiene, 1,9-decadiene and 1,19-icosadiene; diolefins in which only one double bond is terminal, such as 1,4-hexadiene, 1,9-octadecadiene, 6-methyl-1,5-heptadiene, 7-methyl-1,6-octadiene and 11-ethyl-1-11-tridecadiene. Another suitable group of third monomers are those cyclic diolefins which contain a bridged ring and which have 7 to 10 carbon atoms. The bridge is preferably a methano or an ethano-bridge. Examples are unsaturated derivatives of bicyclo(221)heptane containing 2 double bonds such as bicyclo (221)hepta-2,5-diene, dicyclopentadiene, tricyclopentadiene and tetracyclopentadiene; unsaturated derivatives of bicyclo-222-octane containing two double bonds such as bicyclo-222-octa-2,5-diene; unsaturated derivatives of bicyclo-321-octane containing two double bonds, unsaturated derivatives of bicyclo-331-nonane containing two double bonds and unsaturated derivatives of bicyclo-322-nonane containing two double bonds. Also suitable are those bicycloolefins which contain an exocyclic double bond. Examples being methylene norbornene and ethylidene norbornene.

Still another group of suitable polymers are cis- or transpolyalkenamers. These polymers are obtained by ring opening polymerisation of cyclic monoolefins having 5 to 12 carbon atoms. Most suitable are cis- and trans-polypentenamers.

Catalysts consisting of (a) compounds of metals of groups Vb and VIb of the Periodic System and (b) organometallic compounds of groups Ia to IVa of the Periodic System are suitable for the process.

The preferred catalysts consist of (a) halides and oxyhalides of tantalum, molybdenum or tungsten, halide meaning fluoride, chloride, bromide and iodide, such as $TaCl_5$, $TaOCl_3$, $TaBr_5$, $MoCl_5$, $MoOCl_3$, $WCl_5$, $WOCl_4$, $WCl_6$, $WF_6$, $WBr_6$, $WJ_6$ and (b) organo aluminum or organo tin compounds.

Suitable organo aluminum compounds correspond to the formula

wherein $R^1$ is alkyl or alkoxy having 1–12 carbon atoms $R^2$ and $R^3$ is hydrogen, alkyl or alkoxy having 1–12 carbon atoms, halogen (such as F, Cl, Br, I)

Examples of such compounds are:

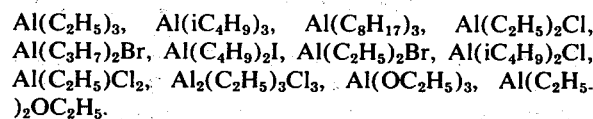

Preferred is the combination of a tungsten halide (chloride or bromide) and an alkyl aluminum halide (chloride, bromide, iodide).

Suitable organo tin compounds are those of the formula

wherein X is hydrogen or halogen such as fluorine, chlorine, bromine and iodine, R is alkyl having 1–20 carbon atoms, aryl having 6–20 carbon atoms, cycloalkyl having 3 to 8 carbon atoms or alkaryl (combined from alkyl and aryl as defined above) and $n$ is 0, 1, 2 or 3.

Examples of such compounds are:
tin tetramethyl, diethyl dimethyl tin, tetraethyl tin, dibutyl diethyl tin, tetrabutyl tin, tetraisocumyl tin, tetraphenyl tin, triethyl tin fluoride, triethyl tin chloride, triethyl tin bromide, triethyl tin iodide, diethyl tin difluoride, diethyl tin dichloride, diethyl tin dibromide, diethyl tin diiodide, ethyl tin trifluoride, ethyl tin trichloride, ethyl tin tribromide, ethyl tin triiodide.

Tungsten halides (e.g. chloride) and alkyl aluminum halides are especially preferred as catalyst components.

The catalyst activity may be increased by the addition of co-catalysts (c). The following co-catalysts may be used:

1. Epoxides of the following general formula

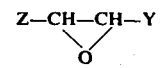

Z = H, alkyl having 1–6 carbon atoms, aryl having 6–20 carbon atoms or aralkyl (combined from alkyl and aryl as defined). Y = H, alkyl having 1–6 carbon atoms, aryl having 6–20 carbon atoms, aralkyl or —CH$_2$—Hal (Hal = F, Cl, Br or I) Z and Y may be substituted e.g. by alkyl (CH$_3$) and/or halogen (Cl);

2. Acetals of the following general formula:

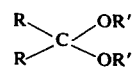

in which R represents hydrogen or optionally halogenated (F, Cl, Br or I) alkyl having 1–6 carbon atoms, aryl having 6–20 carbon atoms or corresponding alkylaryl radical and R' represents an alkylaryl radical (alkyl $C_1-C_6$, aryl $C_6-C_{20}$) which is optionally substituted with halogen (F, Cl, Br or I);

3. haloalcohols of the following general formula

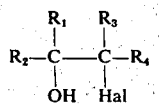

in which Hal = F, Cl, Br or I and $R_1$ and $R_2$ may be the same or different and represent hydrogen or an alkyl, isoalkyl, aryl or aralkyl radical, and $R_3$ and $R_4$ may be identical or different and represent fluorine, chlorine, bromine, iodine, hydrogen, alkyl, aryl or aralkyl; and $R_1$ and $R_3$ together with the carbon atom to which they are attached may form a 5 to 8-membered carbocyclic ring; (alkyl is alkyl having 1–6 carbon atoms, aryl having 6–20 carbon atoms, aralkyl is a combination of both.

4. halophenols of the following general formula

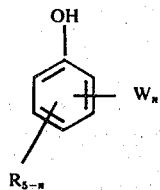

wherein W = fluorine, chlorine, bromine or iodine and R = H, alkyl ($C_1-C_6$), aryl ($C_6-C_{20}$), alkylaryl (alkyl $C_1-C_6$, aryl $C_6-C_{20}$) or a condensed cycloaliphatic or aromatic ring.

The following are specific examples of these co-catalysts: ethylene oxide, propylene oxide, epichlorohydrin, 2-chloroethanol, 2-bromoethanol, 2-fluoroethanol, 2-iodoethanol, 2-chlorocyclohexanol, 2-chlorocyclopentanol, o-, m-, and p-chlorophenol, di-2-chloroethylformal and diethylformal.

The molar ratio of the catalyst components a:b and a:c is between 1:0.5 and 1:15 and between 1:0.3 and 1:10 respectively.

In a preferred embodiment of the process, the metal compound (a) is reacted with co-catalyst (c) in a 0.05 to 0.5 molar solution of hydrocarbons, preferably in the same solvent in which the reaction is carried out. Stable metal compounds of Groups Va and VIa which are readily soluble in organic solvents can be obtained in this way.

The solvents used for the process may be aliphatic or cycloaliphatic or preferably aromatic hydrocarbons or halogenated hydrocarbons, preferably of a boiling range from 50° to 200°C), e.g. hexane, cyclohexane, benzene, toluene, methylene chloride or chlorobenzene.

The process according to the invention is generally carried out as follows:

The reaction is usually carried out in an inert solvent but may also be carried out without solvent. The hydrocarbon polymer which contains —CH=CH-groups is generally used in the form of a 5–50% solution. If the polymer with —CH=CH-groups has a low molecular weight (e.g. molecular weights between 2000 and 10,000) the inert solvent may be omitted. The metal compound (a) of the catalyst is added to the polymer solution, followed by the substituted olefin of formula I.

This mixture is heated to the required reaction temperature which is between −60°C and +60°C and preferably between −20°C and +20°C.

Lastly, the catalyst is activated by the addition of the organometallic compound (b). The reaction proceeds without substantial evolution of heat and is completed within a period of between 5 minutes and 2 hours.

The sequence in which the reactants and catalyst components are added is not critical but it is advantageous to add the organometallic compound last.

The process according to the invention gives rise to polymers with —CH=CH-groups which contain functional groups. If the —CH=CH-groups are in the main chain in the polymer used as starting material then a reduction in the molecular weight of this polymer takes place at the same time. A rearrangement of cis double bonds to trans double bonds is also observed.

The functional groups introduced in this way may be varied by known reactions, for example nitro groups may be reduced to amino groups by known methods: halogens may be substituted by nucleophilic reagents such as amines or mercaptans.

The modified unsaturated polymers obtained by the process of this invention are solid rubber-like products when they have a molecular weight in excess of about 5000 and viscous liquids at lower molecular weights e.g. below 3000. The solid rubber-like products can be used in any application of synthetic rubbers such as in the production of technical rubber articles e.g. rubber hose, conveyor belts, fittings and so on.

They can be vulcanised by the methods usual for rubber, such as by means of sulphur and accelerators. The usual rubber additives such as carbon black fillers, pigment stabilizers, extending oils can be added.

When the reactive end groups in the polymers are halogen atoms e.g. chlorine, bromine or iodine, these products can be crosslinked by means of oxides of polyvalent metals such as magnesium oxide by the same procedure used in crosslinking polychloroprene.

When the reactive end groups are nitro groups, they may be reduced to amino groups by catalytic reduction with hydrogen or by means of iron and hydrochloric acid, following art recognized procedures. The thus formed amino groups are reactive with di- or polyfunctional carboxylic acid anhydrides such as phthalic anhydride pyrromelytic acid anhydride to form polyimide or polyamide bonds, thus effecting crosslinking. These reactions and their conditions are well-known in the art. Also a reaction of the amino group with a polyisocyanate can be carried out which results in high molecular weight polyureas. This reaction i.e. the reaction of a polyamine and a polyisocyanate is well-known and customary in the polyisocyanate polyaddition art. The amino groups can also react with polyfunctional aromatic or aliphatic carboxylic acid chlorides (e.g. phthalic acid chloride, terephthalic acid chloride, benzene tricarboxylic acid chloride). This reaction leads to high molecular weight acid amides e.g. a polyamide bond. This reaction is known from the art of polyamide formation.

Provided the active end groups are cyano groups they can also be reduced to from the corresponding amine by known methods. Subsequent reactions are then the same as mentioned above.

Products containing epoxy end groups are crosslinked on addition of polyfunctional carboxylic acids, their anhydrides or of polyfunctional polyamines under conditions well-known from the art of making epoxy resins.

All these methods are alternative to the usual sulphur/accelerator vulcanisation and are applicable to all polymers of this invention including liquid products. The result of these crosslinking reactions is a rubber-like crosslinked polymer in all instances. The crosslinking methods mentioned above which are in principle art recognized offer decisive advantages over the usual sulphur accelerator vulcanisation as the crosslinking density (i.e. number of crosslinks per unit of volume) can be predetermined. When there are reactive groups only in terminal position of the polymer molecule, the crosslinking density is directly proportional to the molecular weight of the product. Thus it is determined by the molecular weight of the polymer and low molecular weight polymers yield high crosslinking density and high molecular weight polymers yield low crosslinking density.

When the reactive groups are in side-chains the crosslinking density is directly proportional to their number. As this number is known from the structure of the polymer, the crosslinking density can also be predetermined.

The crosslinked products have the same applications as rubber crosslinked by the usual sulphur/accelerator vulcanisation. They are suitable for producing any shaped rubber article, such as those mentioned above.

EXAMPLE 1

A solution in toluene of the reaction product of $WCl_6$ and 2 mols of epichlorohydrin are added to a solution of 50 g of cis-1,4-polybutadiene having 95% of cis double bonds in 1 l of toluene with exclusion of air and moisture at 0°C, the amount of tungsten being such that 1 l of polymer solution contains 1.0 mmol of tungsten. 10 g of crotyl bromide are then added and lastly 4 mmol of diethyl aluminium chloride. The polymer solution is stirred for 2 hours at 0°C to +5°C and the polymer is then precipitated with alcohol. When the polymer has been purified by reprecipitation, 75% of the double bonds have the trans configuration and the polymer is found on analysis to have a bromine content of about 7.4%.

EXAMPLE 2

10 g of 1,4-dichlorobutene-2 are added to a polybutadiene solution which has been prepared as described in Example 1. 2 mmols of the reaction product of $WCl_6$ and chloroethanol (molar ratio 1:1) are then added with stirring. The reaction mixture is cooled to −5°C and 3 mmols of diethyl aluminium chloride are added. The temperature is allowed to rise to 25°C in the course of 1 hour and stirring is then continued for 2 hours at this temperature. After precipitation of the polymer with ethanol and drying at 60°C under vacuum, 60 g of a low molecular weight modified polybutadiene having a chlorine content of 6.2% are obatined.

EXAMPLE 3

2 g of dihydromuconic acid dinitrile are added to a solution of 50 g of cis-polybutadiene in 1 l of toluene. 2.0 mmol of the reaction product of $WCl_6$ and epichlorohydrin (molar ratio 1:2) are then added at +10°C, followed by 8.0 millimols of diethylaluminium chloride. After a reaction time of 5 hours, the modified polymer is precipitated and is then reprecipitated for the purpose of analysis. The nitrogen content is 1.1%.

EXAMPLE 4

4.0 mmol of the tungsten compound described in Example 3 are added to a solution of 50 g of trans-polypentenamer rubber in 1 liter of toluene. The temperature of the solution is then adjusted to 10°C. 10 g of 1,4-dichlorobutene-2 are added to the solution immediately after the addition of 16.0 mmol of aluminium diethyl chloride. The viscosity of the solution has dropped considerably after a reaction time of 4 hours. 5 g of $K_2CO_3$ and 20 ml of methanol are added to the solution. The precipitate is left to settle and the clear solution is concentrated by evaporation under vacuum to 150 ml and then precipitated with methanol. The oily polymer is found on analysis to have a chlorine content of 5.3%.

EXAMPLE 5

A solution of 50 g of polybutadiene in 1 l of toluene is cooled to +5°C and 2.0 millimol of the reaction product of $WCl_6$ and epichlorohydrin (molar ratio 1:2) are added. The reaction mixture is then cooled to −20°C. 8.0 mmol of aluminium triethyl are added, followed immediately by 10 g of allyl glycidyl ether. The temperature is allowed to rise first to 0°C and then after the reaction time of one hour to +25°C. The modified polymer was precipitated with ethanol after 15 hours and carefully dried under vacuum. Analysis of the polymer indicated 0.8% of oxygen.

EXAMPLE 6

100 g of butadiene are polymerised in 1.0 l of benzene as solvent with the aid of 0.05 mmol of cobalt octoate and 5.0 millimol of ethyl aluminium sesquichloride. After a polymerisation time of 4 hours at 50°C, 8.0 mmol of diethyl aluminium chloride were added to the resulting polybutadiene solution. 20 g of 1,4-dichloro-butene-2 were then added at +10°C. After the addition of 2.0 mmol of the reaction product of $WCl_6$ and epichlorohydrin, the reaction mixture was left to stand for 12 hours at 20°C. On working up the product, a modified polybutadiene having a chlorine content of 5.8% was obtained.

We claim:

1. A process for introducing reactive chlorine, bromine, iodine, cyanide, nitro or epoxy groups into a polymer containing —CH=CH-groups selected from the group consisting of polymers of conjugated dienes, said dienes having 4 to 8 carbon atoms, ethylene-propylene-diolefin-terpolymers and cis- and trans-polyalkenamers obtained by ring opening polymerization of cyclic mono-olefins having 5 to 12 carbon atoms which comprises reacting at least one such polymer with an olefin in an amount of 0.005 to 0.5 mol of said olefin per mol of double bonds in the main chain of said polymer of 0.01 to 1 mol of said olefin per mol of double bonds in the side chains of said polymer, said olefin being of the formula

R — CH = CH — R wherein R is hydrogen, alkyl having 1 to 6 carbon atoms, cycloalkyl having 5 to 7 carbon atoms,

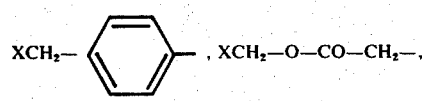

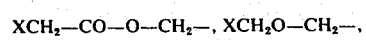

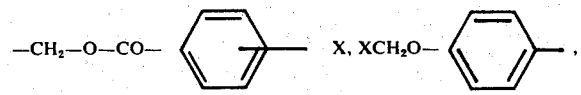

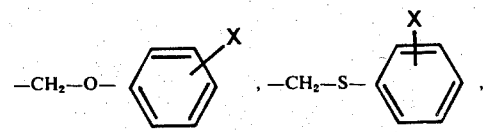

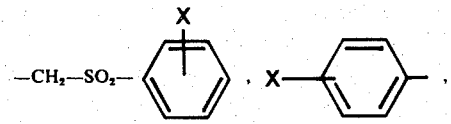

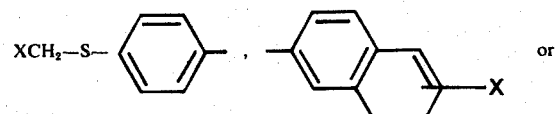

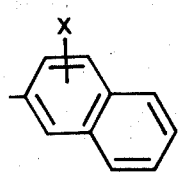

wherein X is chlorine, bromine, iodine, cyanide, nitro or

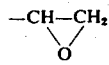

and wherein at least one R is not hydrogen and is substituted by chlorine, bromine, iodine, cyanide, nitro or

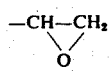

and said reaction being carried out in the presence of an organometallic mixed catalyst of
  a. a halide of a metal of Group Vb or VIb of the Periodic System,
  b. an organometallic compound of Groups Ia and IV of the Periodic System and
  c. a cocatalyst selected from the group consisting of
    1. a compound of the formula

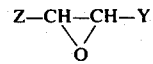

wherein Z is hydrogen, alkyl having 1 to 6 carbon atoms, aryl having 6 to 20 carbon atoms, aralkyl having 6 to 20 carbon atoms in the aryl moiety and 1 to 6 carbon atoms in the alkyl moiety or said aryl or aralkyl substituted with methyl or chlorine and Y is hydrogen, alkyl having 1 to 6 carbon atoms, aryl having 6 to 20 carbon atoms, aralkyl having 6 to 20 carbon atoms in the aryl moiety and 1 to 6 carbon atoms in the alkyl moiety, —CH$_2$—Hal wherein Hal is fluorine, chlorine, bromine or iodine or said aryl or aralkyl substituted with methyl or chlorine and
    2. a compound of the formula

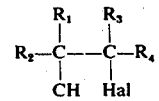

wherein Hal is fluorine, chlorine, bromine or iodine, $R_1$ and $R_2$ which may be the same or different are hydrogen, alkyl having 1 to 6 carbon atoms, aryl having 6 to 20 carbon atoms or aralkyl having 6 to 20 carbon atoms in the aryl moiety and 1 to 6 carbon atoms in the alkyl moiety and $R_3$ and $R_4$, which may be the same or different, are fluorine, chlorine, bromine, iodine, hydrogen, alkyl having 1 to 6 carbon atoms, aryl having 6 to 20 carbon atoms or aralkyl having 6 to 20 carbon atoms in the aryl moiety and 1 to 6 carbon atoms in the alkyl moiety and $R_1$ and $R_3$, when taken together with the carbon atoms to which they are attached, form a 5- to 8-membered carbocyclic ring, the molar ratio of (a):(b):(c) being 1:0.5 to 15:0.3 to 10.

2. Process according to claim 1 wherein the polymer is a homopolymer of a conjugated diene or a copolymer of a diene with up to 80% by weight of a monoethylenically unsaturated compound.

3. Process according to claim 1 wherein the polymer is an ethylenepropylene-diolefin-terpolymer.

4. Process according to claim 1 wherein the polymer is a polyalkenamer.

5. Process according to claim 1 wherein the organometallic compound is an aluminum or tin compound.

* * * * *